United States Patent [19]
Myers

[11] Patent Number: 5,369,603
[45] Date of Patent: Nov. 29, 1994

[54] CALIBRATION OF A NON-LINEAR SENSOR

[76] Inventor: Allen Myers, Rural Route 2, Ames, Iowa 50010

[21] Appl. No.: 911,919

[22] Filed: Jul. 19, 1992

[51] Int. Cl.$^5$ ............................................. G06F 15/20
[52] U.S. Cl. ............................. 364/571.02; 364/554; 364/571.01; 364/573
[58] Field of Search ............ 364/554, 571.01, 571.02, 364/573

[56] References Cited

U.S. PATENT DOCUMENTS

| | | | |
|---|---|---|---|
| 4,581,714 | 4/1986 | Reid | 364/573 X |
| 5,132,897 | 7/1992 | Allenberg | 364/554 X |
| 5,247,467 | 9/1993 | Nguyen et al. | 364/571.02 |

Primary Examiner—Edward R. Cosimano
Attorney, Agent, or Firm—Kent A. Herink; Brian J. Laurenzo; Brett J. Trout

[57] ABSTRACT

A method and apparatus for determining the calibration characteristic of a sensor which produces an output signal which has a non-linear relationship to the value of a measured parameter. In one embodiment of the invention, the non-linear input/output characteristic of the sensor is represented by an equation of a curve. In another embodiment of the invention, the non-linear input/output characteristic is approximated by a series of straight lines which correspond to a series of ranges in the output signal. During periods of measurement, the output signal of the sensor is repeatedly sampled and used to calculate running totals of data sums which are subsequently used in combination with the characteristic parameters for the curve or series of straight lines for calculating the time integral of the measured parameter. The actual value of the quantity represented by the time integral is also measured by separate means. After obtaining several corresponding calculated and actual values of the time integrals, the parameters of the curve or the series of straight lines are adjusted so that subsequent calculated values more closely approximate actual values. This method is particularly useful for determining calibration characteristics of a grain mass flow rate sensor which is used on a harvester. The calculated time integrals represent the masses of quantities of grain which are accumulated over different harvesting periods. Actual masses of these quantities of grain are separately measured by weighing them after they are unloaded from the harvester.

16 Claims, 8 Drawing Sheets

CALIBRATION OF A NON-LINEAR SENSOR

FIELD OF THE INVENTION

The present invention relates to methods and apparatus for calibrating a sensor which has a non-linear input/output characteristic, wherein the output signal of said sensor has a non-linear relationship to the value of a measured parameter. More specifically, the present invention relates to methods and apparatus for calibrating a mass flow rate measuring system which is used for continuously measuring grain mass flow rate in a harvester as grain is harvested.

BACKGROUND OF THE INVENTION

Methods for measuring mass flow rate of grain in a harvester have been used to provide a grain flow rate signal which can be used to calculate either the total mass of grain harvested within a given field area or the instantaneous yield of the crop at the present location of the harvester in the field. These data are useful to the agricultural producer to allow measuring the effect of different soft conditions or crop growing practices on crop yield. Total mass of grain is calculated by integrating grain mass flow rate versus time. Instantaneous crop yield is calculated by dividing instantaneous grain mass flow rate by the instantaneous rate at which the harvester is harvesting the field area.

Numerous methods have been used to measure mass flow rate of grain on harvesters. Co-pending U.S. patent application Ser. No. 07/716,293 discloses means and methods for measuring grain mass flow rate at the exit of a paddle type chain conveyor, by measuring the force resulting from grain striking an impact plate as grain exits the conveyor. Other methods, such as measuring electrical or electromagnetic properties of grain passing by or contacting a means for sensing said properties have also been used.

It is desirable to use a sensor which produces an output signal which is substantially linearly proportional to the value of the measured parameter. With such a sensor, calibration to establish accurate estimated values of the measured parameter requires only establishing the baseline output of the sensor that exists at zero value of the measured parameter, and the gain or scale factor, which is the ratio of a change in sensor output to a change in the measured parameter, of the sensor. Since gain is a constant value due to the linear input/output relationship, it can be established by measuring the output signal of the sensor at any value of the measured parameter.

However, in some measuring applications, it is not possible or practical to build a sensor which produces a highly linear input/output characteristic. In such cases, a sensor with a non-linear input/output characteristic must be used, which greatly increases the difficulty of accurately calibrating the sensor. Since the input/output characteristic of a non-linear sensor is a curve, and not a straight line, many more calibration constants are required to accurately describe the shape of the curve. Further, accurately establishing the shape of the curve requires measurement of the output signal of the sensor at many values of the measured parameter.

In some measuring systems, such as those for measuring grain mass flow rate on harvesters, identical sensors used in different physical installations, such as different machine models, or with different operating conditions, such as different grain types, have different non-linear input/output characteristics. The cost to perform tests to measure input/output characteristics for all combinations of machine models and grain types would be enormous, and makes such an approach impractical. Further, sensor input/output characteristics for a given machine model may vary from machine to machine due to slight variations in mechanical dimensions. It is therefore desirable to establish a method whereby an accurate input/output characteristic can be determined for a given sensor using values of a parameter which is easily measurable during actual field operation. On a harvester utilizing a mass flow rate measurement system which integrates grain mass flow rate versus time to obtain accumulated masses of separate loads of grain, said loads can be weighed on scales to determine their actual mass, after they are unloaded from the harvester onto a transport vehicle such as a truck or a wagon. Since load masses are the only measurements which are readily available during field operation of a harvester, it is desired to have a method to use these actual load masses to establish the input/output characteristics for a given sensor, harvester and grain type.

In prior art systems for measuring grain mass flow rate on a harvester, such at the system disclosed in co-pending application Ser. No. 07/716,293, the non-linear input/output characteristic for the grain mass flow rate sensor is represented by either an equation of a curve, such as a fourth-order polynomial, or by a series of straight line segments which approximate the curve with sufficient accuracy to limit approximation errors to small values. During a harvesting period when a load of grain which is to be weighed is harvested, the total accumulated mass of grain is computed by calculating grain mass flow rate at regular time intervals such as 1 second, based on the average grain impact force measured during each time interval, and integrating calculated grain mass flow rate over time as grain is harvested. After the load of grain is transferred from the harvester and is weighed, the actual mass obtained can then be used to calculate an adjustment factor which can be multiplied by the calculated load mass to obtain the actual load mass. This adjustment is equivalent to adjusting the values of the non-linear input/output characteristic curve for the sensor by this same adjustment factor at all points on the curve. If the initial shape of the non-linear curve is correct, this adjustment provides the correct non-linear curve which can subsequently be used for accurate calculation of grain mass flow rate during subsequent harvesting periods. However, if the initial shape of the curve is not correct, the adjusted curve will not accurately represent the actual input/output characteristic curve and will not produce accurate calculation of grain mass flow rate at all levels of mass flow rate. If actual masses are obtained for several loads of grain for which separate masses are calculated, and if the initial estimated shape of the non-linear curve is incorrect, different adjustment factors will be calculated for each load if the occurrences of mass flow rate levels are distributed differently for each load of grain, which is the usual ease. These adjustment factors can be averaged to obtain an average adjustment factor, to minimize errors due to an incorrect estimated shape of the characteristic curve, but accuracy is still limited by inability to accurately determine the actual shape of the curve during field harvesting. It is therefore desired to establish a practical method of accurately establishing the shape of the actual non-linear input/output characteristic curve of the grain mass flow rate sensor during field harvesting.

SUMMARY OF THE INVENTION

An object of the present invention is to provide a new and novel method and apparatus for calibrating a sensor having a non-linear input/output characteristic.

Another object of the present invention is to provide a method of calibrating a sensor having a non-linear input/output characteristic which utilizes separately measured values of the time-integral of the measured parameter over finite time intervals.

A further object of the present invention is to provide a method of calibrating a grain mass flow rate sensor on a harvester utilizing actual measured masses of separate loads of grain which are accumulated during field harvesting of grain.

The foregoing objects of the present invention are provided by a system including a grain mass flow rate sensor which utilizes the linear momentum imparted to grain by the clean grain elevator of a harvester as grain exits the elevator. A vertical impact plate is mounted in the path of grain exiting the elevator. The impact plate stops the horizontal motion of grain striking it, thus changing the linear momentum of the grain and causing a reaction force to be exerted on the impact plate which is generally proportional to grain mass flow rate. This impact force is measured and is used in combination with a non-linear flow calibration characteristic, which relates grain mass flow rate to average impact force, to calculate grain mass flow rate. The impact plate is mounted on a load beam, on which strain gauges are mounted to provide electrical measurement of the force exerted on the impact plate by grain.

Electronic means continuously amplifies and filters the output of the strain gauges. This amplified signal, which varies directly with force on the impact plate, is averaged over a finite time period, such as 1 second. The zero force offset value of the amplified signal is subtracted from the average value of said signal to provide a net value which is directly proportional to impact force. This net value is multiplied by a force calibration factor, which has been pre-determined for the particular load beam and signal conditioning circuit, to provide the actual value of average impact force.

Electronic computing and memory means converts the average impact force measured by the load beam into grain mass flow rate based on a flow calibration characteristic for the particular clean grain elevator and grain type. The use of a non-linear flow calibration characteristic provides high accuracy of grain mass flow rate measurement by compensating for non-linearities in the relationship between grain mass flow rate and average force exerted by grain on the impact plate.

In a first embodiment of the invention, the values of impact force measured at regular time intervals, such as one second, during harvesting are stored in the memory means for subsequent calculation of the total mass of grain accumulated during a harvesting period. These values are stored in memory for several harvesting periods and are subsequently used for establishing the shape and scale factor of the non-linear characteristic curve by adjusting the parameters of the curve through a trial-and-error process which obtains the best possible match of calculated load masses to actual load masses. The computing means also stores actual masses of grain accumulated during the harvesting periods for use in adjusting the parameters of the non-linear curve. The actual masses are determined by separately weighing the loads of grain after they are unloaded from the harvester. The actual mass values are entered into the memory means by the harvester operator using an operator interface.

In a second embodiment of the invention, the electronic computing means approximates the non-linear relationship between grain mass flow rate and average impact force with a series of straight line segments which correspond to a series of ranges of the impact force. Within each force range, grain mass flow rate is estimated using a straight line relationship between a first mass flow rate corresponding the lower boundary and a second mass flow rate corresponding to the upper boundary of the force range. The computing means also calculates and stores in the memory means, sums which are used to calculate the total mass of grain measured within each of said force ranges. These sums, which are accumulated for all force ranges, are used to calculate the total mass of grain accumulated during a finite harvesting time period. The memory means also stores separately measured values of actual masses of grain accumulated during the harvesting periods, and adjusts the parameters of the straight line segments of the multiple straight line calibration characteristic to obtain good matching of the actual masses and the corresponding calculated values of grain mass.

These and other objects and advantages of the present invention, as well as details of illustrative embodiments, will be more fully understood from the drawings and the detailed description of the invention.

DETAILED DESCRIPTION OF THE INVENTION

The present invention is particularly useful when used with the means and methods disclosed in co-pending U.S. patent application Ser. No. 07/716,293, and the disclosure of said application is included herein by reference.

Figure 1:
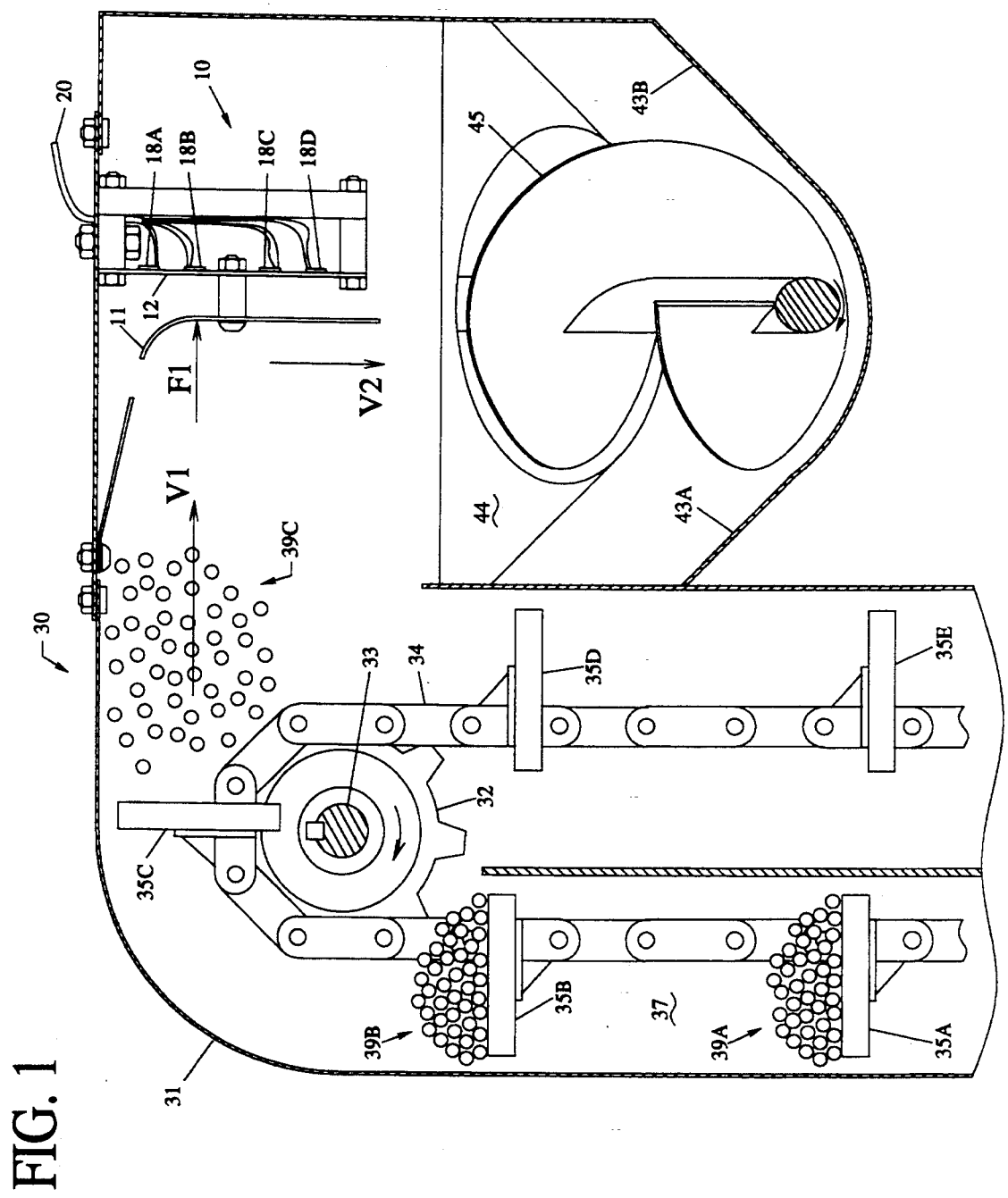
FIG. 1 is a vertical cross section through the upper or outlet end of the clean grain elevator of a typical harvester, with a grain mass flow rate sensor installed in a grain collection area near the outlet of the elevator.

Referring first to FIG. 1, a grain mass flow rate sensor generally designated as 10 is positioned at the outlet of a clean grain elevator, generally designated at 30, of a harvester. Clean grain elevator 30 includes an elevator housing 31 and a chain sprocket 32 which rotates with a shaft 33 to drive a conveyor paddle chain 34, which wraps around the sprocket 32 and to which are attached paddles 35A-35E for lifting grain from the inlet or lower end of clean grain elevator 30 to the outlet or upper end of clean grain elevator 30. Sprocket 32 rotates clockwise as viewed, causing paddles 35A-35E to lift quantities of grain such as 39A and 39B upward within a compartment 37. When a link of the chain 34 to which a paddle such as 35C Is connected contacts sprocket 32, the chain link and attached paddle travel in a circular arc about shaft 33, imparting generally horizontal motion to a quantity of grain such as 39C, causing grain to exit clean grain elevator 30 into collection area 44. Collection area 44 includes sloped lower surfaces 43A and 43B which cause grain to collect around grain storage tank loading auger 45, which is a screw type auger which conveys grain from collection area 44 into the grain storage tank (not shown) of the harvester.

Grain mass flow rate sensor 10 includes an impact plate 11 which is attached to load beam 12, to which four strain gauges 18A-18D are bonded. Cable 20 contains eight electrical conductors which connect said strain gauges to remote signal conditioning circuitry {FIG. 2).

A quantity of grain such as 39C initially travels with generally horizontal velocity V1 toward impact plate 11. Upon striking impact plate 11, the horizontal motion of quantity of grain 39C is stopped and the grain subsequently fails into collection area 44 with final velocity V2, which is generally vertical. The change in the horizontal component of velocity of quantity of grain 39C from V1 to substantially zero corresponds to a change in horizontal momentum of this quantity of grain which is proportional to both the mass of quantity of grain 39C and initial velocity V1. A force F1, which is proportional to the change of momentum of quantity of grain 39C, is created on impact plate 11 and is measured by load beam 12.

Figure 2:
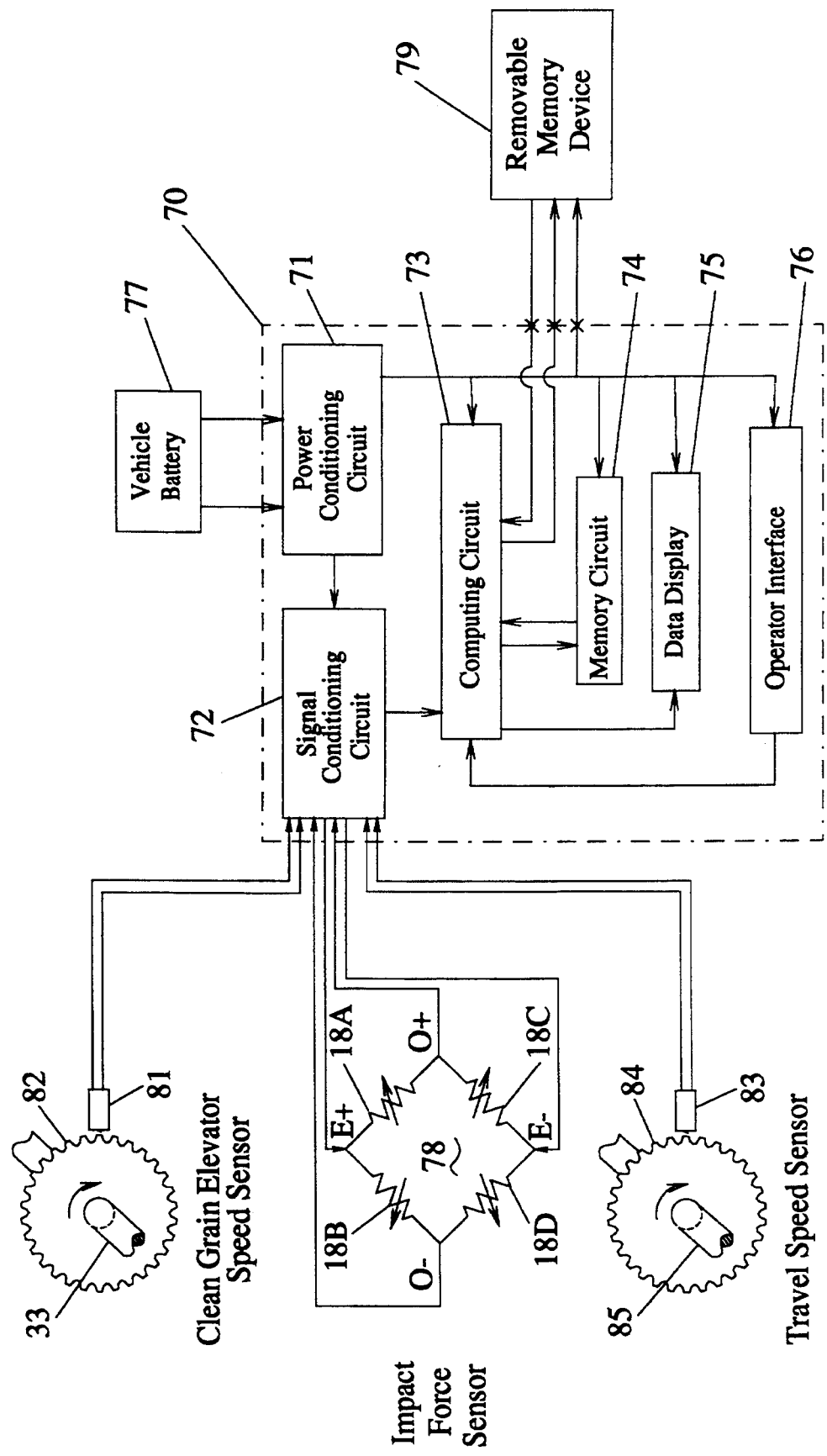
FIG. 2 is a schematic diagram of a complete system for measuring grain mass flow rate, harvester travel speed and clean grain elevator speed; and for computing, storing and displaying measured values or other useful data which are computed from said values.

Referring now to FIG. 2, a diagram of a complete grain mass flow measuring system of the present invention is illustrated. An electronic monitor, generally indicated as 70, includes a power conditioning circuit 71, a signal conditioning circuit 72, a computing circuit 73, a memory circuit 74, a data display 75 and an operator interface 76. Signal conditioning circuit 72 includes excitation and sensing means for a strain gauge bridge 78 and a pair of shaft speed sensors 81 and 83. Strain gauges 18A-18D of FIG. 1 are shown schematically in FIG. 2. The system of FIG. 2 also includes a pair of toothed wheels 82 and 84, which are used in cooperation with the corresponding speed sensors 81 and 83 to measure the actual speeds of the clean grain elevator shaft 33 and of the shaft 85 which rotates at a speed proportional to travel speed of the harvester.

Power conditioning circuit 71 is supplied with electrical power from the electrical system battery 77 of the harvester. This power conditioning circuit protects the remaining circuitry of electronic monitor 70 from harmful transients and supplies one or more regulated constant voltages which are required by the other circuits.

Strain gauge bridge 78 is energized by a constant voltage differential, E+ minus E−, which is supplied from signal conditioning circuit 72. The arrangement of the strain gauges in bridge 78 is such that the output differential voltage, O+ minus O−, is proportional only to forces perpendicular to the load beam. Signal conditioning circuit 72 amplifies and filters the output differential voltage of bridge 78 and provides a conditioned signal to computing circuit 73.

Signal conditioning circuit 72 amplifies bridge output voltage O+ minus O−, which is very small, in the range of 5 millivolts maximum, to a level which is accurately measurable by computing circuit 73. Circuit 72 also filters out unwanted high frequency noise from the amplified signal.

Signal conditioning circuit 72 also filters and amplifies signals from the pulse type speed sensors 81 and 83 which are used to provide alternating voltage signals with frequencies proportional to the speeds of rotation of the respective shafts 33 and 85. Toothed wheels 82 and 84 have multiple protruding teeth which generate alternating voltages in a corresponding one of the speed sensors 81 and 83 as these teeth pass by the speed sensors. Toothed wheel 84 can be mounted directly on a wheel of the harvester or it can be mounted on a shaft in the driving means for the drive wheels of the harvester. It is also possible to eliminate toothed wheel 84 and speed sensor 83 by using alternate means for measuring harvester travel speed, such as a radar speed sensor which directly measures the speed of the harvester structure relative to the surface of the field. It is also possible to eliminate toothed wheel 82 and speed sensor 81 by calculating clean grain elevator speed from the impact force signal measured by the load beam, as is described in the referenced co-pending application.

Computing circuit 73 is implemented with digital electronics due to the superior computational capabilities of digital computing devices such as micro-processors. Computing circuit 73 calculates useful data based on the signals received from signal conditioning circuit 72. This data can be stored in memory circuit 74 for later retrieval, and can be displayed immediately to the harvester operator on data display 75.

Operator interface 76 includes manually operable devices such as switches which allow the harvester operator to perform functions such as selecting the type of data to be displayed on data display 75, entering calibration parameters, and managing the data stored in memory circuit 74.

A removable memory device 79 can be removed from monitor 70, which is mounted on the harvester, and transported to a remote location for reading yield and area data which is stored in the memory device.

Figure 3:
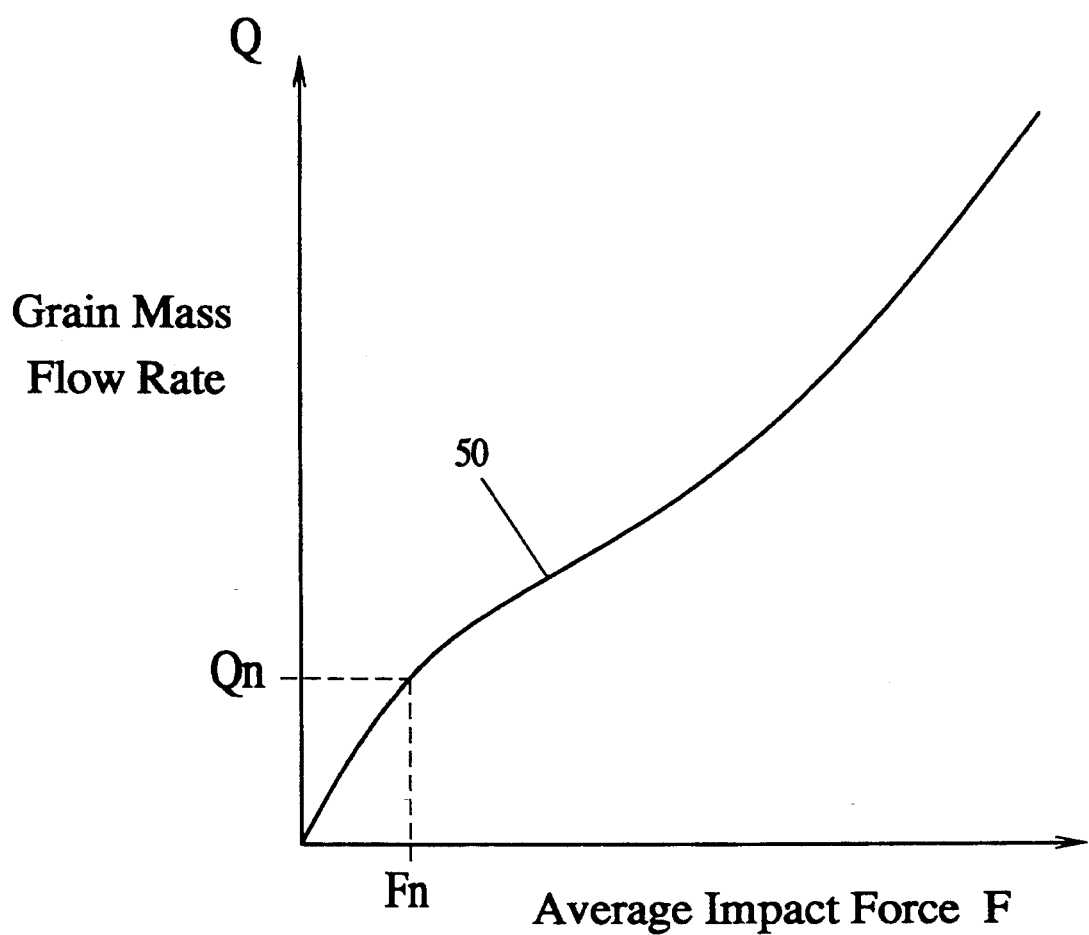
FIG. 3 is a graphical representation of a typical flow calibration characteristic which relates grain mass flow rate to average impact force exerted by grain on the impact plate of the grain mass flow rate sensor of FIG. 1.

FIG. 3 illustrates a typical flow calibration characteristic for the grain mass flow rate sensor 10 of FIG. 1. Characteristic curve 50 relates average grain mass flow rate Q to average impact force F exerted by grain on the impact plate. In the first embodiment of the invention, the computing circuit 73 of FIG. 2 uses an equation, such as a fourth order polynomial expression, to describe characteristic curve 50, and uses this equation in conjunction with a value of average impact force F to calculate a corresponding value of actual grain mass flow rate Q.

Average impact force F is computed from the output signal of the strain gauges 18A-18D of FIGS. 1-2 at regular time intervals, the period of which is termed the recording period. A value for grain mass flow rate Q, such as Qn in FIG. 3, is calculated from an average value of force F, such as Fn, which is determined during each recording period. The mass of grain which exits the clean grain elevator of FIG. 1 during each recording period is estimated by multiplying the calculated value of mass flow rate Q by the time duration of the recording period. The total mass of grain which exits the clean grain elevator during a harvesting period, which comprises a series of many recording periods, is calculated as the sum of the grain mass values calculated for each recording period in the harvesting period.

Figure 4:
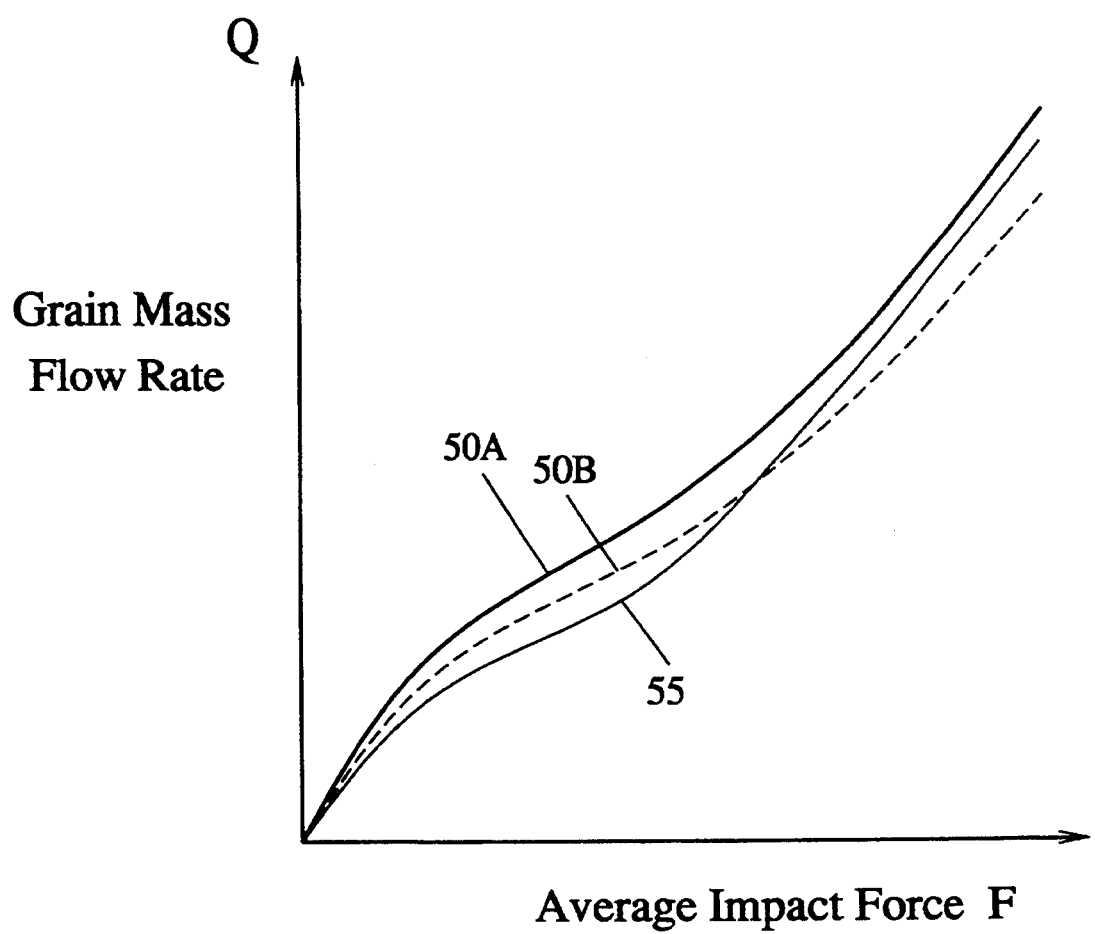
FIG. 4 is a graphical representation of three different flow calibration characteristics, illustrating an attempt to re-scale a first characteristic curve to match a second characteristic curve.

The inability of prior art systems to accurately determine the actual shape of flow sensor calibration characteristic curves during field harvesting will now be described with reference to FIG. 4, which shows three calibration characteristic curves, 50A, 50B and 55. Curve 50A represents an incorrect calibration characteristic which has been used to compute the total mass of grain harvested during a harvesting period. Curve 55, which is unknown at the time that the grain is harvested, represents the correct calibration characteristic for the particular harvester and grain type. If the grain accumulated in the harvester during the harvesting period is transferred to a hauling vehicle and weighed to determine its actual mass, the ratio of actual mass to calculated mass can be used to adjust the vertical scale of curve 50A, producing a corrected curve such as 50B, having the same shape as curve 50A, but having a different scale factor. As can be seen in FIG. 4, corrected curve 50B approximates correct curve 55, but does not accurately represent curve 55, because incorrect curve 50A and correct curve 55 have different shapes. This has been found to be a serious limitation of prior art mass flow measuring systems.

In the first embodiment of the present invention, the total mass of grain harvested within a harvesting period is computed using an equation, such as a fourth order polynomial, which represents the non-linear calibration characteristic curve 50 of FIG. 3. For a given occurrence Fn of impact force F, an estimated value Qn of grain mass flow rate Q is calculated from an equation such as Equation (1).

$$Qn = C0 + C1\ (Fn) + C2\ (Fn)^2 + C3\ (Fn)^3 + C4\ (Fn)^4 \quad \text{Equation (1)}$$

Where C0-C4 are the coefficients of the fourth order polynomial. For a series of individual values of Fn recorded during a harvesting period, the total mass of grain Mt accumulated during this period is then calculated from Equations (2a)-(2d), all of which are equivalent.

$$Mt = \Sigma[Qn][Tr] \quad \text{Equation (2a)}$$

$$Mt = \Sigma[C0 + C1\ (Fn) + C2\Sigma(Fn)^2 + C3\Sigma(Fn)^3 + C4\Sigma(Fn)^4][Tr] \quad \text{Equation (2b)}$$

$$Mt = [\Sigma C0 + C1\Sigma(Fn) + C2\Sigma(Fn)^2 + C3\Sigma(Fn)^3 + C4\Sigma(Fn)^4][Tr] \quad \text{Equation (2c)}$$

$$Mt = [N\ (C0) + C1\Sigma(Fn) + C2\Sigma(Fn)^2 + C3\Sigma(Fn)^3 + C4\Sigma(Fn)^4][Tr] \quad \text{Equation (2d)}$$

Where N is equal to the number of recording periods, each having a time duration of Tr, within the harvesting period for which Mt is being calculated. During harvesting, the values of N, $\Sigma(Fn)$, $\Sigma(Fn)^2$, $\Sigma(Fn)^3$ and $\Sigma(Fn)^4$ are stored in the memory circuit 74 of FIG. 2 for each harvesting period, and are recalulated during each recording period by incrementing them by values calculated from the value of Fn for each respective recording period.

After one or more loads of grain have been harvested during one or more corresponding harvesting periods, these loads have been individually weighed after being unloaded from the harvester, and their actual masses have been entered into the memory circuit 74 of FIG. 2, the computing circuit 73 adjusts the values of polynomial coefficients C0-C4 to obtain the best possible match between the calculated load masses and the actual load masses. To adjust the scale factor of the characteristic curve, such as to transform curve 50A of FIG. 4 into curve 50B, the values of coefficients C0-C4 are all multiplied by the same adjustment factor. To change the shape of the curve, the values of coefficients C0-C4 are adjusted individually by a trial-and-error process whereby each coefficient is adjusted upward and downward by small increments to find the value which provides the best match between calculated and actual load masses. It should be noted that although a fourth order polynomial expression is used for illustrative purposes, a polynomial of any order, or any other type of equation which can describe a curve, can be used.

Figure 6:
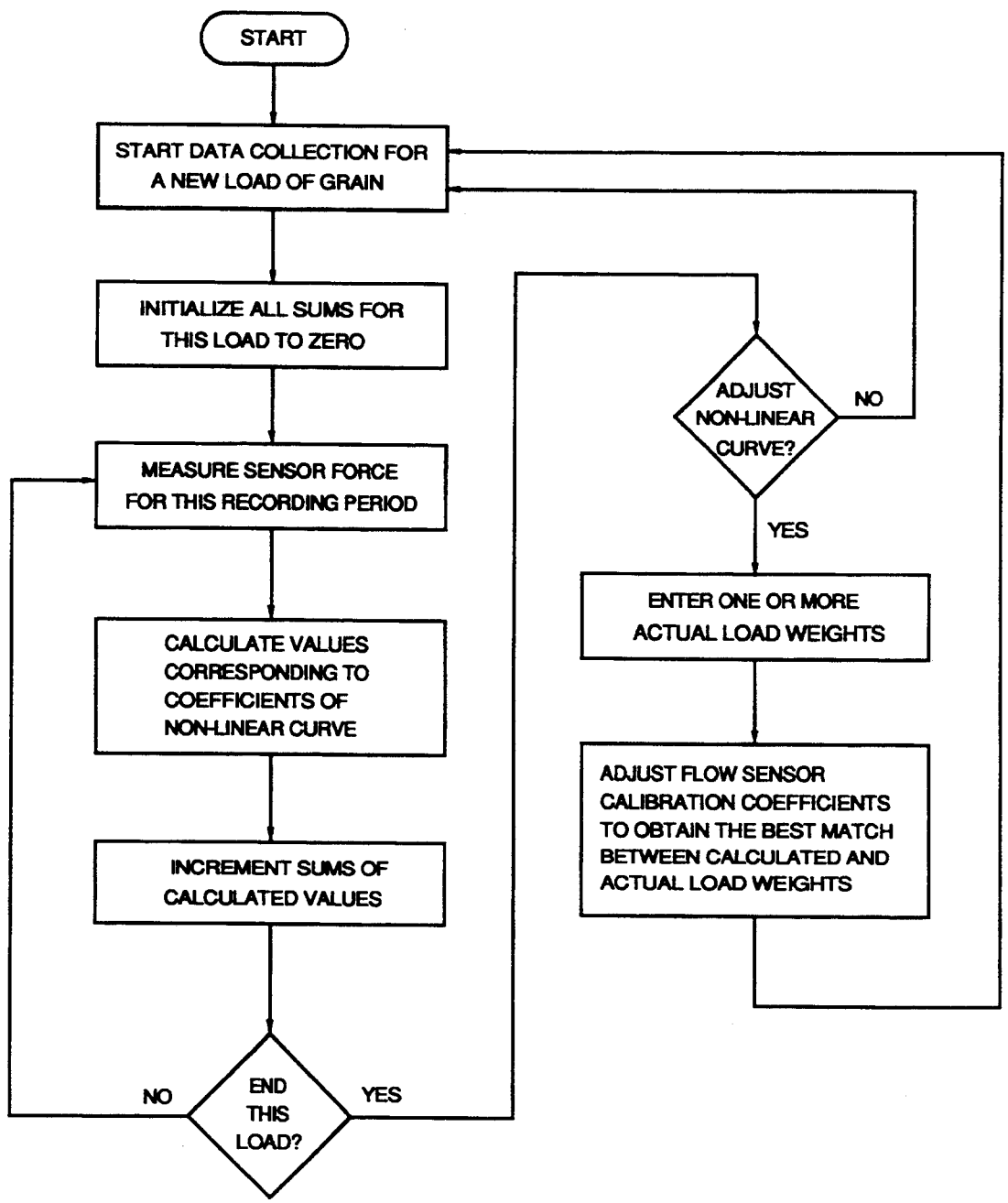
FIG. 6 is a flow chart diagram of a first preferred embodiment of the invention where sums of values associated with coefficients of a non-linear equation are incremented during each recording period.

A flow chart diagram of the above-described process is illustrated in FIG. 6. At the start of data collection for each new load of grain (step 100), the values of the sums $\Sigma(Fn)$, $\Sigma(Fn)^2$, $\Sigma(Fn)^3$ and $\Sigma(Fn)^4$ stored in the memory circuit 74 of FIG. 2 are initialized to zero (step 102). During each recording period, the sensor or impact force Fn is measured (step 104) and the present values of (Fn), $(Fn)^2$, $(Fn)^3$ and $(Fn)^4$ are calculated (step 106) by the computing circuit 73 of FIG. 2 which also increments the sums of Fn, $(Fn)^2$, $(Fn)^3$ and $(Fn)^4$ (step 108). At step 110, if the harvesting period is not yet completed, a new recording period is started by returning to step 104. At the end of the harvesting period, if one or more loads of grain have actually been weighed, the harvester operator may choose at step 112 to enter one or more actual weights into the memory circuit 74 at step 114. The computing circuit 73 then adjusts the values of the polynomial coefficients C0-C4 (step 116). If actual load weights have not been entered, or after the coefficients C0-C4 have been adjusted, the computing circuit 73 returns to step 100.

Although the above method is theoretically capable of accurately determining the correct characteristic curve, such as 55 of FIG. 4, it has practical limitations due to the difficulty associated with finding the correct coefficients of a complex equation which is capable of describing a curve with multiple inflection points. This occurs because the shape of the curve may be very sensitive to some coefficients, yet relatively insensitive to others. Further the sensitivity of the shape of the curve to each coefficient does not remain constant, but is different at different points on the curve arid also varies as the other coefficients are adjusted. A further problem is that with an equal number of actual masses and curve coefficients, it is possible to obtain an exact match between calculated and actual load masses, with coefficients which define a curve which is greatly different than the correct curve at values of Fn where little or no operation occurred during harvesting of the weighed loads. This type of error is very likely to occur where most of the harvesting operation occurs in a relatively narrow band of grain mass flow rates. With an equation such as a polynomial describing the characteristic curve, it is not possible to avoid this type of problem by adjusting only some of the coefficients, because the coefficients are not each associated with a particular portion of the curve. Each coefficient affects all portions of the curve.

A second embodiment of the present invention provides a further improved method of calibrating a non-linear sensor which avoids the problems described in the above paragraph. This improved method is described with reference to FIG. 5, where five straight line segments 60–64 are used to closely approximate calibration characteristic curve 50 of FIG. 3. Each straight line segment has two characteristic parameters associated with it, a zero force intercept A and a slope B. For example, extension of straight line segment 64 to a zero value of force F results in a zero intercept value of A4, while the slope of line 64 is B4. Similarly, lines 60–63 have zero intercepts A0–A3 and slopes B0–B3, respectively.

The horizontal position of the end points of lines 60–64 define force values F0–F5, which define upper and lower boundaries of ranges of force F corresponding to line segments 60–64. For example, if impact force F has a value Fi, which is between the values of F2 and F3, the parameters of line 62 are used to calculate the corresponding mass flow rate value Qi, using the equation for a straight line, as shown in Equation (3).

$$Qi = A2 + (B2)(Fi) \qquad \text{Equation(3)}$$

Similarly, the appropriate values of A and B are used for any value of force F which falls into any of the other force ranges.

Figure 5:
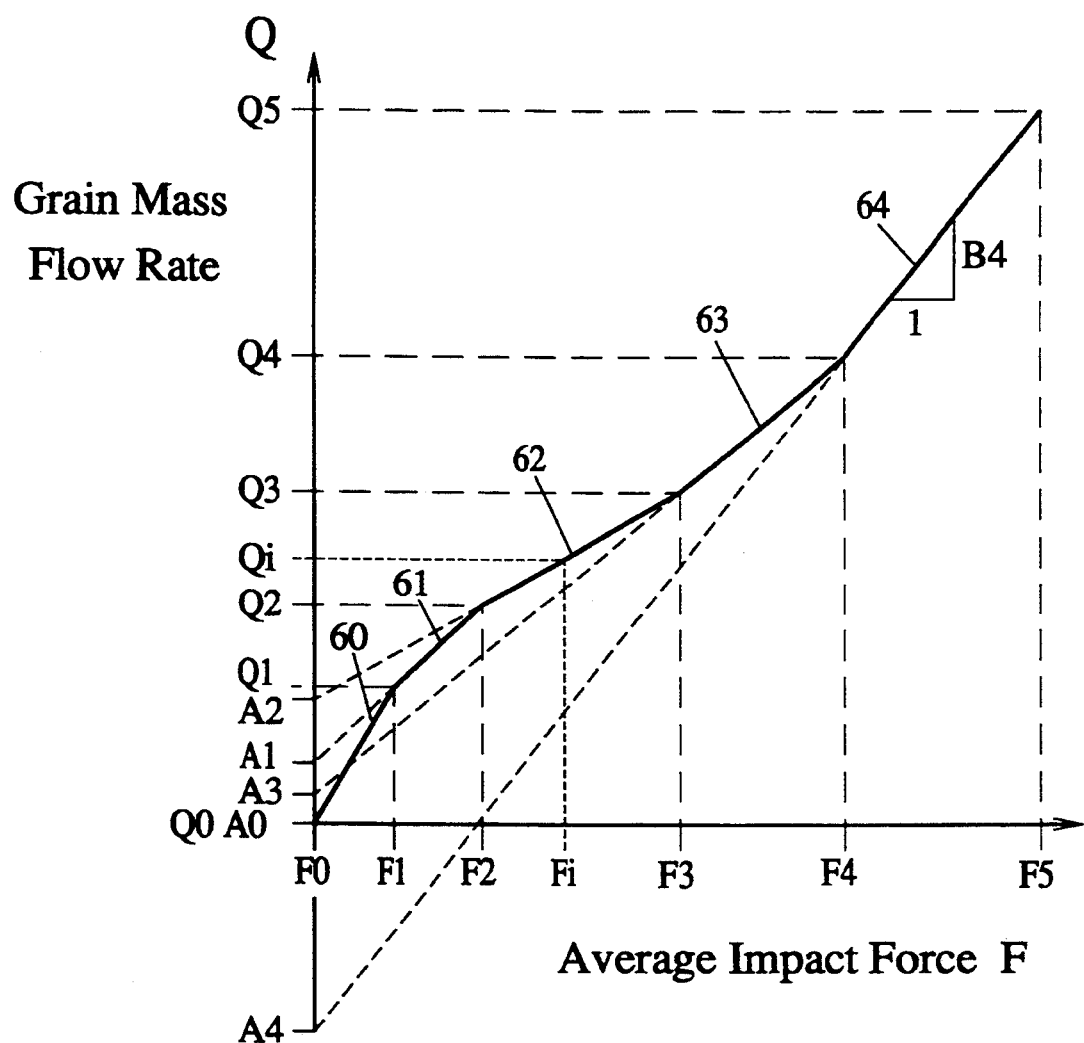
FIG. 5 is a graphical representation of the flow calibration characteristic curve of FIG. 3 when approximated by a series of straight line segments, illustrating parameters which are used for calculation of mass flow rate.

To allow adjustment of the parameters of the straight line segments 60–64 of FIG. 5 after one or more loads of grain have been harvested and separately weighed, values representative of the values of Fn occurring in each force range during the harvesting period for each load must be stored in the memory circuit 74 of FIG. 2. It is possible to store every value of Fn in the memory circuit, and to calculate the total mass of grain Mt harvested in a given harvesting period using Equation (4a) or (4b), which are equivalent.

$$Mt = \Sigma[Qn][Tr] \qquad \text{Equation(4a)}$$

$$Mt = \Sigma[A + (B)(Fn)][Tr] \qquad \text{Equation(4b)}$$

Where the values of A and B are chosen for the proper force range for each value of Fn. However, this method requires a large mount of memory, because there can be thousands of Fn values in each harvesting period. Also, the large number of computations required to calculate Mt requires a large computation time.

Figure 8:
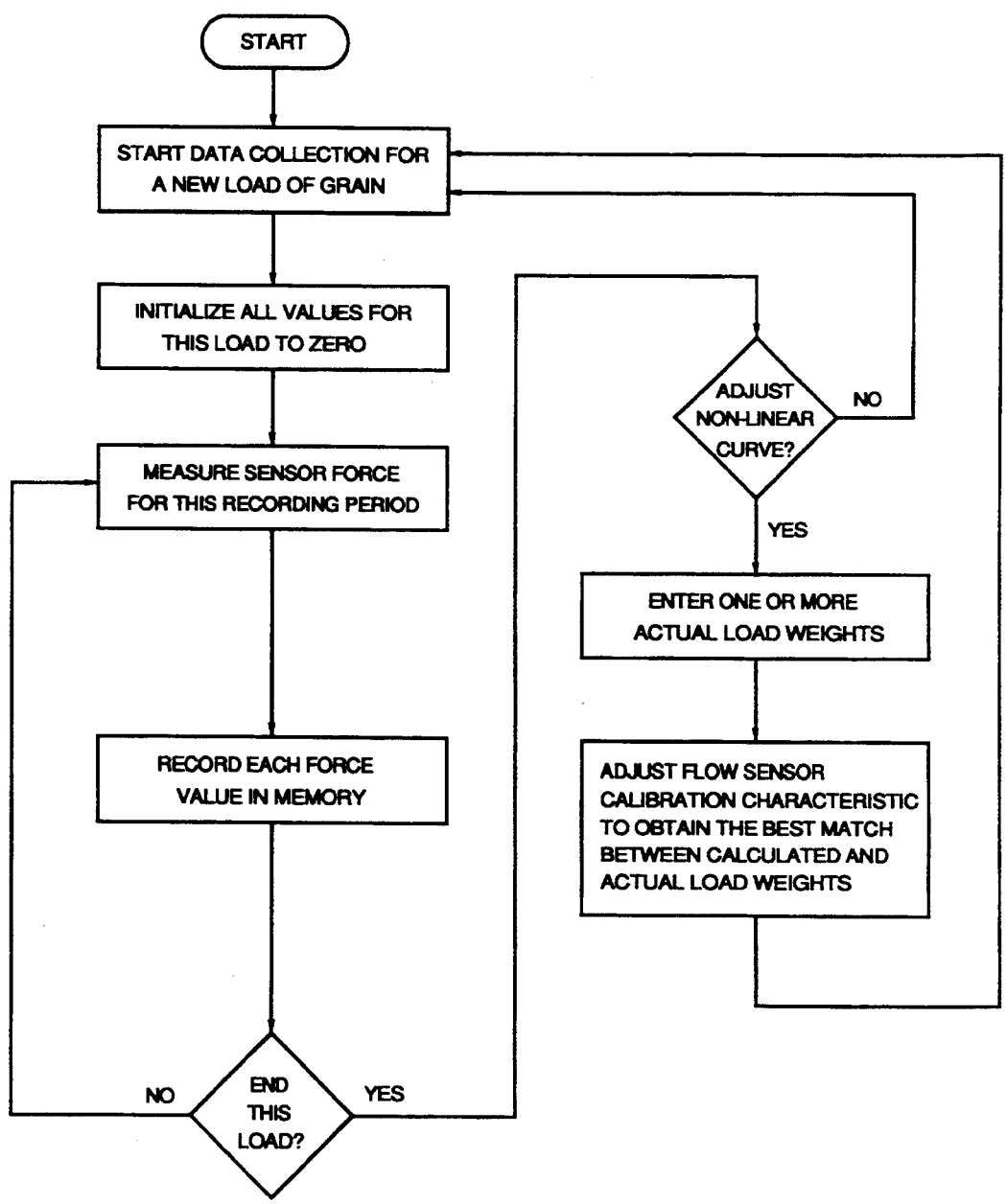
FIG. 8 is a flow chart diagram of a variation of the second preferred embodiment where every measured value of sensor force F is recorded in memory.

A flow chart diagram of the above-described embodiment where the memory circuit 74 is sufficiently large is illustrated in FIG. 8. The steps 100–104 and 110–116 are again the same as in the first preferred embodiment. In this variation, all force values Fn are stored (step 122) in the memory circuit 74 of FIG. 2.

The memory and calculation time requirements of the above method can be greatly reduced by storing only values which are representative of the number of occurrences and the sum of the force values Fn which occur in each of the force ranges of FIG. 5 for each harvesting period. Equations (5a)–(5c), which are all equivalent, illustrate how the total mass of grain M2–3 which exits the clean grain elevator is calculated for the total of all recording periods within a harvesting period where impact force F2–3 falls within force range F2 to F3, which corresponds to line segment 62 in FIG. 5.

$$\Sigma M2\text{-}3 = \Sigma[Q2\text{-}3][Tr] \qquad \text{Equation(5a)}$$

$$\Sigma M2\text{-}3 = \Sigma[A2 + (B2)(\Sigma F2\text{-}3)][Tr] \qquad \text{Equation (5b)}$$

$$\Sigma M2\text{-}3 = [(N2\text{-}3)\,(A2) + (B2)\,(\Sigma F2\text{-}3)][Tr] \qquad \text{Equation (5c)}$$

Where Q2–3 is the mass flow rate calculated for an individual recording period, N2–3 is the number of recording periods and Σ F2–3 is the sum of all values of impact force F, which occur during the harvesting period when the measured impact force F is between F2 and F3. The same method is used to calculate the mass of grain which exits the clean grain elevator when force F is in the other force ranges, and the total mass of grain Mt accumulated during a harvesting period is calculated by summing the grain masses calculated for each force range, as illustrated by Equation (6a), which is expanded into Equation (6b) by use of Equation (5c).

Equation (6a)
$$Mt = \Sigma M0\text{-}1 + \Sigma M1\text{-}2 + \Sigma M2\text{-}3 + \Sigma M3\text{-}4 + \Sigma M4\text{-}5$$

Equation (6b)
$$Mt = [(N0\text{-}1)(A0) + (B0)(\Sigma F0\text{-}1) + (N1\text{-}2)(A1) +$$
$$(B1)(\Sigma F1\text{-}2) + (N2\text{-}3)(A2) + (B2)(\Sigma F2\text{-}3) + (N3\text{-}4)(A3) +$$
$$(B3)(\Sigma F3\text{-}4) + (N4\text{-}5)(A4) + (B4)(\Sigma F4\text{-}5)] [Tr]$$

Where the variable suffixes 0–1 through 4–5 refer to the force rages F0–F1 through F4–F5 of FIG. 5. For each harvesting period, the N and ΣF values corresponding to each force range are stored in the memory circuit 74 of FIG. 2. At any subsequent time, the total mass of grain accumulated during a harvesting period can be calculated using equation (6b) with the N, ΣF, A and B values which are stored in the memory circuit.

Figure 7:
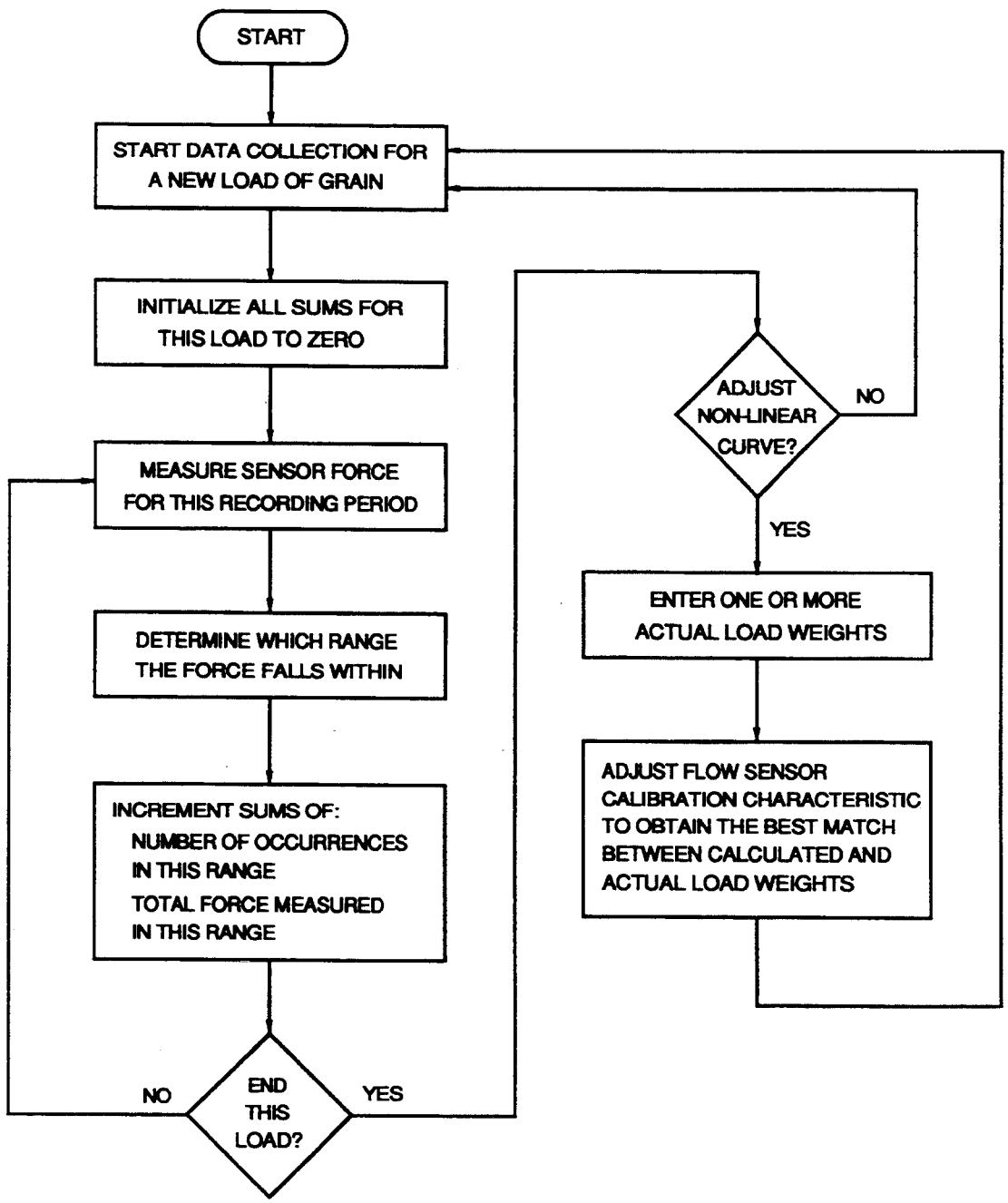
FIG. 7 is a flow chart diagram of a second preferred embodiment where sums of values associated with particular ranges of sensor force F are incremented during each recording period.

A flow chart diagram of the above-described second preferred embodiment process is illustrated in FIG. 7, wherein the steps 100–104 and 110–116 are the same as in the first preferred embodiment. After the sensor impact force F for the recording period has been measure at step 104, the computing circuit 73 of FIG. 2 determines which range (F0–1, F1–2, F2–3, F3–4 or F4–5) the measured force falls within (step 118) and then increments the value stored in the memory circuit 74 for the number of occurrences (N0–1), N1–2, N2–3, N3–4 or N4–5) in this range and the sum of the forces (Σ(F0–1), Σ(F1–2), Σ(F2–3), Σ(F3–4) or Σ(F4–5)) measured in this range (step 120).

The memory circuit 74 of FIG. 2 is large enough that the N and ΣF values can be permanently stored for a large number of harvesting periods. The operator interface 76 is also configured to allow the harvester operator to enter actual mass values, which have been determined by weighing the loads of grain which have been accumulated during individual harvesting periods. The computing circuit 73 then uses the actual mass values to adjust parameters A0–A4 and B0–B4 to provide the best match between calculated and actual mass values.

Although not essential to the present invention, parameters A0–A4 and B0–B4 are usually adjusted so that the end points of line segments 60–64 Join as shown in FIG. 5. To maintain joining of end points, parameters A0–A4 and B0–B4 cannot all be adjusted independently. For simplicity of calculation, mass flow rate values Q0–Q4, which correspond to force values of F0–F4, can be adjusted independently, and the resulting values of A0–A4 and B0–B4 can be calculated from the values of Q0–Q4 and F0–F4. Fixed values are usually used for F0–F4, but this is not essential to the present invention.

This second embodiment of the present invention provides improved ability to optimize the shape of the non-linear calibration characteristic because the parameters (Q0–Q5), which are varied to obtain the best match between calculated and actual load masses, are clearly related to corresponding portions of the calibration characteristic. For example, adjustment of Q3 affects only the shape of the calibration characteristic in the force range between F2 and F4.

The method for optimizing the shape of the multiple straight line calibration characteristic of FIG. 5 involves trial and error adjustment of the values of Q0–Q5 to find the combination of these values which produce the best match between calculated and actual load masses for several harvesting periods. The preferred method of performing this optimization is to individually vary each of the values of Q0–Q5 by small positive and negative mounts to find the values which produce the best match between calculated and actual load masses. To determine the best match between calculated and actual load masses, a measure of the degree of matching must be calculated during the optimization process. The preferred measure of the degree of matching is the average percent error existing between calculated and actual masses when the overall scale factor of the calibration characteristic is adjusted so that the sum of all calculated masses equals the sum of all actual masses for the harvesting periods which are being used for the optimization. The scale factor of the calibration characteristic is adjusted without changing the shape of the characteristic by multiplying all values of Q0–Q5 by the same adjustment factor.

It is also necessary to include logic in the optimization process to prevent determination of incorrect values of Q0–Q5. Actual load masses which have initial large deviations from the corresponding calculated load masses should not be used in the optimization process, since they usually represent a load where a problem has occurred, such as operator error in entry of an actual mass value. Also, the number of Q0–Q5 values which are used in the optimization process should be determined by the number of actual load masses which are available. If only one actual mass is available, only the scale factor is adjusted. If two actual masses are available, the scale factor and one Q0–Q5 value is adjusted. As additional actual masses are available, an additional Q0–Q5 value can be adjusted for each additional actual mass. However, Q0–Q5 values which adjust the shape of the calibration characteristic in force ranges where little or no force values have occurred should not be used in the optimization process.

The above described method allows the grain mass flow measuring system of FIG. 2 to determine an accurate calibration characteristic for a particular harvester and grain type during grain harvesting. In a typical harvest season, data will be recorded for several hundred harvesting periods for each grain type. The present invention allows optimizing the accuracy of calculating the accumulated grain mass for each of these periods, using only a small number, such as 5 to 10, separately measured values of actual load mass. Further, the actual mass values do not need to be obtained at the start of harvesting, but can be obtained at any time during the harvest season.

It should be recognized that although calibration characteristic curve 50 of FIG. 3 is approximated by five straight line segments in FIG. 5, a greater or smaller number of line segments could be used. It should also be recognized that the present invention is useful with any type of sensor which has either a linear or a non-linear input/output characteristic. Further, the present invention can be used with sensors which do not produce a DC voltage output, but produce outputs of DC current, AC voltage or current, frequency, sound intensity or light intensity. The only limitation on the type of usable sensor output is that it must be measurable by use of signal conditioning and computing circuits.

The foregoing description of the preferred embodiments of the present invention has been presented to illustrate the best mode of implementing the subject invention. It is not intended to be exhaustive nor to limit the invention to the precise form disclosed. Other embodiments are possible without departing from the scope of the invention, and it is intended that the scope of the invention be limited only by the claims appended hereto.

I claim:

1. Apparatus for adjusting the value of a first measured parameter, comprising:

sensing means for producing an output signal which has a non-linear relationship to the value of said measured parameter;

computing means for calculating an estimated value of said measured parameter by using the value of said output signal in combination with a non-linear input output characteristic of a particular shape which relates values of said output signal to values of said measured parameter;

said computing means is operable to calculate estimated values of a second parameter which is represented by the time integral of said estimated values of said measured parameter during finite time periods;

said computing means is operable to utilize separately measured actual values of said parameter to adjust the shape of said non-linear input-output characteristic to cause said calculated values of said second parameter to closely approximate said actual values of said second parameter; and wherein said calculation of said time integral is performed utilizing a plurality of data sums which are recorded during measurement of said measured parameter during said finite time periods, each of said data sums corresponding to a separate one of a plurality of ranges of said output signal of said sensor.

2. The apparatus of claim 1 wherein said non-linear input/output characteristic of said sensor is approximated by a plurality of straight line segments corresponding to said plurality of said ranges of said output signal.

3. The apparatus of claim 2 wherein said data sums comprise totals of occurrences of said output signal and totals of the values of said output signal which occur in each of said ranges of said output signal.

4. Apparatus for adjusting the value of mass flow rate of grain in a harvester, comprising:

a mass flow rate sensor which produces an output signal which has a non-linear relationship to grain mass flow rate;

computing means for calculating an estimated grain mass flow rate by using the said output signal in combination with a non-linear input/output characteristic of a particular shape which relates said output signal to said grain mass flow rate;

wherein said computing means is operable to calculate total masses of grain which are accumulated during finite time periods;

wherein said computing means is operable to utilize separately measured actual masses of grain accumulated during said finite time periods to adjust the shape of said non-linear input/output characteristic to cause said calculated values of said calculated masses of said grain to closely approximately said actual masses; and wherein said calculation of said time integral is performed utilizing a plurality of data sums which are recorded during measurement of grain mass flow rate during said finite time periods, each of said data sums corresponding to a separate one of a plurality of ranges of said output signal of said sensor.

5. The apparatus of claim 4 wherein said non-linear input/output characteristic of said sensor is approximated by a plurality of straight line segments corresponding to said plurality of said rages of said output signal.

6. The apparatus of claim 5 wherein said data sums comprise totals of occurrences of said output signal and totals of the values of said output signal which occur in each of said ranges of said output signal.

7. A method for determining the calibration characteristic of a sensor which produces an output signal which has a non-linear relationship to the value of a first measured parameter, said method comprising the steps of:

repeatedly calculating at a first time period an estimated value for said measured parameter from said output signal and an initial calibration characteristic;

calculating a second parameter represented by the time integral of said estimated values of said measured parameter over a plurality of second time periods, each of which include a plurality of occurrences of said first time period; comparing separately measured actual value of said second parameter to said calculated values of said second parameter;

adjusting said calibration characteristics so that subsequent calculation of said second parameter will result in calculated values of said second parameter which more closely approximate said actual values of said second parameter; and wherein said calculation of said time integrals is performed utilizing multiple data sums which are recorded during measurement of said measured parameter, each of said data sums corresponding to a separate one of a plurality of ranges of said output signal of said sensor.

8. The method of claim 7 wherein said non-linear input/output characteristic of said sensor is approximated by a plurality of straight line segments corresponding to said plurality of said ranges of said output signal.

9. The method of claim 8 wherein said data sums comprise totals of the occurrences of said output signal and totals of the values of said output signal which occur in each of said ranges of said output signal.

10. A method for determining the calibration characteristic of a grain mass flow rate sensor which is utilized in a harvester and which produces an output signal which has a non-linear relationship to grain mass flow rate, said method comprising the steps of:

repeatedly calculating at a first time period an estimated value for grain mass flow rate from said output signal and an initial calibration characteristic;

calculating the time integral of said estimated values over a plurality of second time periods which each include multiple occurrences of said first time period, to produce estimated values for masses of the quantities of grain accumulated during said second time periods;

comparing separately measured actual masses of said quantities of grain accumulated over said second time periods to said calculated values for the masses of said quantities of grain;

adjusting said calibration characteristic so that subsequent calculation of said time integrals will result in calculated values of the masses of said quantities of grain which more closely approximate said actual values; and wherein said calculation of said time integrals is performed utilizing multiple data sums which are recorded during measurement of grain mass flow rate, each of said data sums corresponding to a separate one of a plurality of ranges of said output signal of said sensor.

11. The method of claim 10 wherein said non-linear input/output characteristic of said sensor is approximated by a plurality of straight line segments corresponding to said plurality of said ranges of said output signal.

12. The method of claim 11 wherein said data sums comprise totals of the occurrences of said output signal and totals of the values of said output signal which occur in each of said ranges of said output signal.

13. Apparatus for adjusting the value of a first measured parameter, comprising:

sensing means for producing an output signal which has a non-linear relationship to the value of said measured parameter;

computing means for calculating an estimated value of said measured parameter by using the value of said output signal in combination with a non-linear input/output characteristic of a particular shape which relates values of said output signal to values of said measured parameter;

said computing means is operable to calculate estimated values of a second parameter which is represented by the time integral of said estimated values of said measured parameter during finite time periods;

wherein said calculation of said time integral is performed utilizing a plurality of data sums which are recorded during measurement of said measured parameter during said finite time periods, each of said data sums corresponding to a separate coefficient of an equation representing said non-linear input/output characteristic; and said computing means is operable to utilize separately measured actual values of said second parameter to adjust the shape of said non-linear input/output characteristic to cause said calculated values of said second parameter to closely approximate said actual values of said second parameter.

14. Apparatus for adjusting the value of mass flow rate of grain in a harvester, comprising:

a mass flow rate sensor which produces an output signal which has a non-linear relationship to grain mass flow rate;

computing means for calculating an estimated grain mass flow rate by using the said output signal in combination with a non-linear input/output characteristic of a particular shape which relates said output signal to said grain mass flow rate;

wherein said computing means is operable to calculate total masses of grain represented by the time integral of said grain mass flow rate which are accumulated during finite time periods;

wherein said calculation of said time integral is performed utilizing a plurality of data sums which are recorded during measurement of said grain mass flow rate during said finite time periods, each of said data sums corresponding to a separate coefficient of an equation representing said non-linear input/output characteristic; and wherein said computing means is operable to utilize separately measured actual masses of grain accumulated during said finite time periods to adjust the shape of said non-linear input/output characteristic to cause said calculated values of said calculated masses of said grain to closely approximate said actual masses.

15. A method for determining the calibration characteristic of a sensor which produces an output signal which has a non-linear relationship to the value of a first measured parameter, said method comprising the steps of:

repeatedly calculating at a first time period an estimated value for said measured parameter from said output signal and an initial calibration characteristic;

calculating a second parameter represented by the time integral of said estimated values of said measured parameter over a plurality of second time periods each of which include a plurality of occurrences of said first time period;

wherein said calculation of said time integral is performed utilizing multiple data sums which are recorded during measurement of said measured parameter, each of said data sums corresponding to a separate coefficient of an equation representing said non-linear input/output characteristic;

comparing separately measured actual values of said second parameter to said calculated values of said second parameter; and adjusting said calibration characteristic so that subsequent calculation of said second parameter will result in calculated values of said second parameter which more closely approximate said actual values of said second parameter.

16. A method for determining the calibration characteristic of a grain mass flow rate sensor which is utilized in a harvester and which produces an output signal which has a non-linear relationship to grain mass flow rate, said method comprising the steps of:

repeatedly calculating at a first time period an estimated value for said grain mass flow rate from said output signal and an initial calibration characteristic;

calculating the time integral of said estimated values over a plurality of second time periods which each include multiple occurrences of said first time period, to produce estimated values for masses of the quantities of grain accumulated during said second time periods;

wherein said calculation of said time integral is performed utilizing multiple data sums which are recorded during measurement of said grain mass flow rate, each of said data sums corresponding to a separate coefficient of an equation representing said non-linear input/output characteristic;

comparing separately measured actual masses of said quantities of grain accumulated over said second time periods to said calculated values for the masses of said quantities of grain; and adjusting said calibration characteristic so that subsequent calculation of said time integrals will result in calculated values of the masses of said quantities of grain which more closely approximate said actual values.

* * * * *